United States Patent [19]

Kersting

[11] Patent Number: 4,611,989

[45] Date of Patent: Sep. 16, 1986

[54] HORIZONTALLY EXTENDING CURING DEVICES

[76] Inventor: Erik Kersting, 67 Vanier Dr., Guelph, Ontario, Canada, N1G 2K9

[21] Appl. No.: 770,252

[22] Filed: Aug. 28, 1985

[51] Int. Cl.[4] ........................ F27B 9/00; B65G 47/22

[52] U.S. Cl. .................................. 432/121; 198/495; 432/72; 432/148; 432/155

[58] Field of Search ................. 432/72, 121, 140, 148, 432/155; 198/495

[56] References Cited

U.S. PATENT DOCUMENTS

| | | | |
|---|---|---|---|
| 1,473,897 | 11/1923 | Batchell | 432/155 |
| 1,583,046 | 5/1926 | Ingle | 432/155 |
| 1,709,371 | 4/1929 | Piron et al. | 432/140 |
| 1,857,447 | 5/1932 | Engels | 432/198 |
| 3,819,032 | 6/1974 | Preuss et al. | 198/495 |

FOREIGN PATENT DOCUMENTS

| | | | |
|---|---|---|---|
| 2082133 | 3/1982 | United Kingdom | 198/495 |

*Primary Examiner*—John J. Camby

[57] ABSTRACT

The present invention provides a curing device to provide at least partial curing of different materials and is particularly suited with mangled materials. The device itself comprises a curing region to receive the material, an incinerator for generating heated gases with closed ducting extending through the curing region from the incinerator and a fan for blowing the heated gases through the ducting. Provided within the curing region is a belt-like carrier, for carrying the material through the curing region, with the carrier being heat conductive and in heat exchange with the ducting, whereby heat from the heated gases is transferred from the ducting, through the carrier, to the material, to effect the curing without the gases blowing directly on and disturbing the material.

19 Claims, 8 Drawing Figures

HORIZONTALLY EXTENDING CURING DEVICES

FIELD OF THE INVENTION

The present invention relates to a curing device, particularly suited for the curing of mangled material and using a closed ducting heat transfer system, which eliminates blowing of hot gases on, and distributing the material to be cured.

BACKGROUND OF THE INVENTION

There are presently available, many different types of curing devices. The bulk of these devices incorporate heat generating means for generating heated gases, which, through a fan system, blow directly on the material to be cured. However, in some instances, such as in the curing of mangled material, including loosely interwoven fabrics and resin powder, these types of open air curing devices suffer from the unacceptable drawback that the fibre and powder are blown into the surrounding atmosphere, creating serious environmental health problems.

SUMMARY OF THE PRESENT INVENTION

The present invention provides a curing device, particularly designed to overcome the serious drawback described above. More particularly, the present invention provides a curing device to provide at least partial curing of the material in the device with the device comprising a curing region to receive the material, heating means for generating heated gases with closed ducting means, extending from the heating means, through the curing region and fan means for blowing the heated gases through the ducting means. Provided within the curing region is carrier means for carrying the material through the curing region with the carrier means being heat conductive and in heat exchange with the ducting means whereby heat from the heated gases is transferred from the ducting means, through the carrier means, to the material to effect the curing without the gases blowing directly on and disturbing the material.

Through the use of closed ducting means, and the heat exchange arrangement within the curing region, the material is not subject to anything other than normal convection currents within the curing region providing a much more stable environment and substantially eliminating the inadvertent release of airborn pollutants from the material to be cured, thereby making the device particularly suited for use in the curing of mangled material. The mangled material itself can be put to many different uses, such as, for example, the construction of fire walls and compartment flooring in automobiles. The curing device of the present invention is designed to enable either a complete or a partial curing of the material, which in the latter case, ensures that the material is in a partially set stage, enabling it to be handled, and worked to a final desired shape, according to the end use for the material.

BRIEF DISCUSSION OF THE DRAWINGS

The above, as well as other advantages and features of the present invention will be described in greater detail according to the preferred embodiments of the present invention in which.

DETAILED DESCRIPTION ACCORDING TO THE PREFERRED EMBODIMENTS OF THE PRESENT INVENTION

Figure 1:
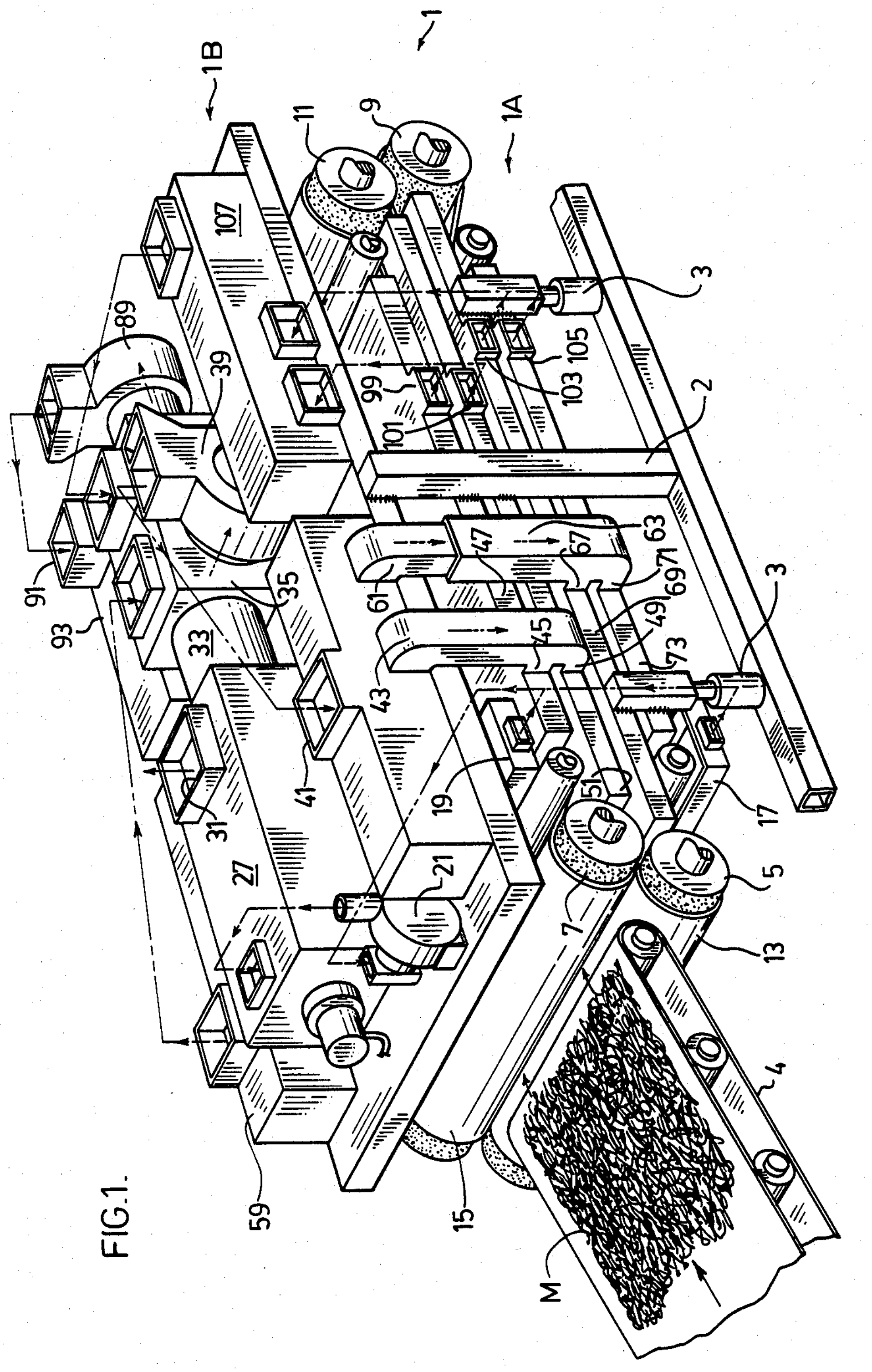
FIG. 1 is a perspective view looking down on a curing device, according to a preferred embodiment of the present invention.
Figure 2:
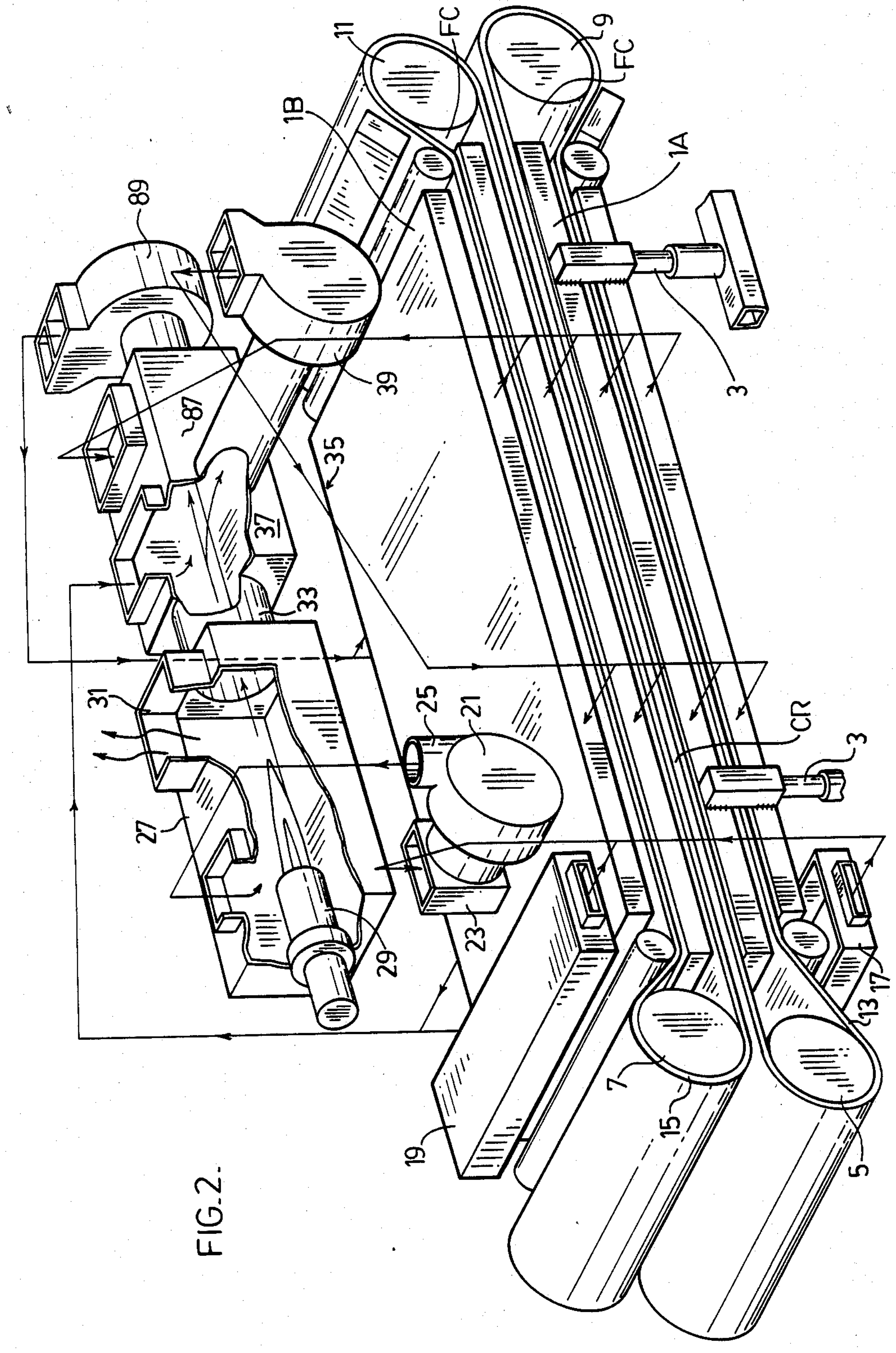
FIG. 2 is a partially exploded perspective view of the main components of the curing device of FIG. 1.

The main exterior components of the preferred embodiment curing device are best seen in FIGS. 1 and 2. The device itself is generally indicated at 1, and comprises lower and upper body sections 1A and 1B, respectively. These two body sections are separated by a curing region CR, which extends the length of the curing device. A feed belt 4 (which does not form part of the present invention) feeds the material M, which, as described above, may be a mangle, or any other suitable material, to the feed area of the curing region. This feed area is defined by lower and upper rollers 5 and 7, around which drive belts 13 and 15 are respectively rotated. The exit end of the curing device is defined by drive rollers 9 and 11, around which the upper and lower drive belts are also fitted. Each of these drive rollers is provided with a fibre cloth covering F.C. which substantially increases the coefficient of friction on the roller's surfaces for positive engagement with the drive belts through the curing region.

Figure 3:
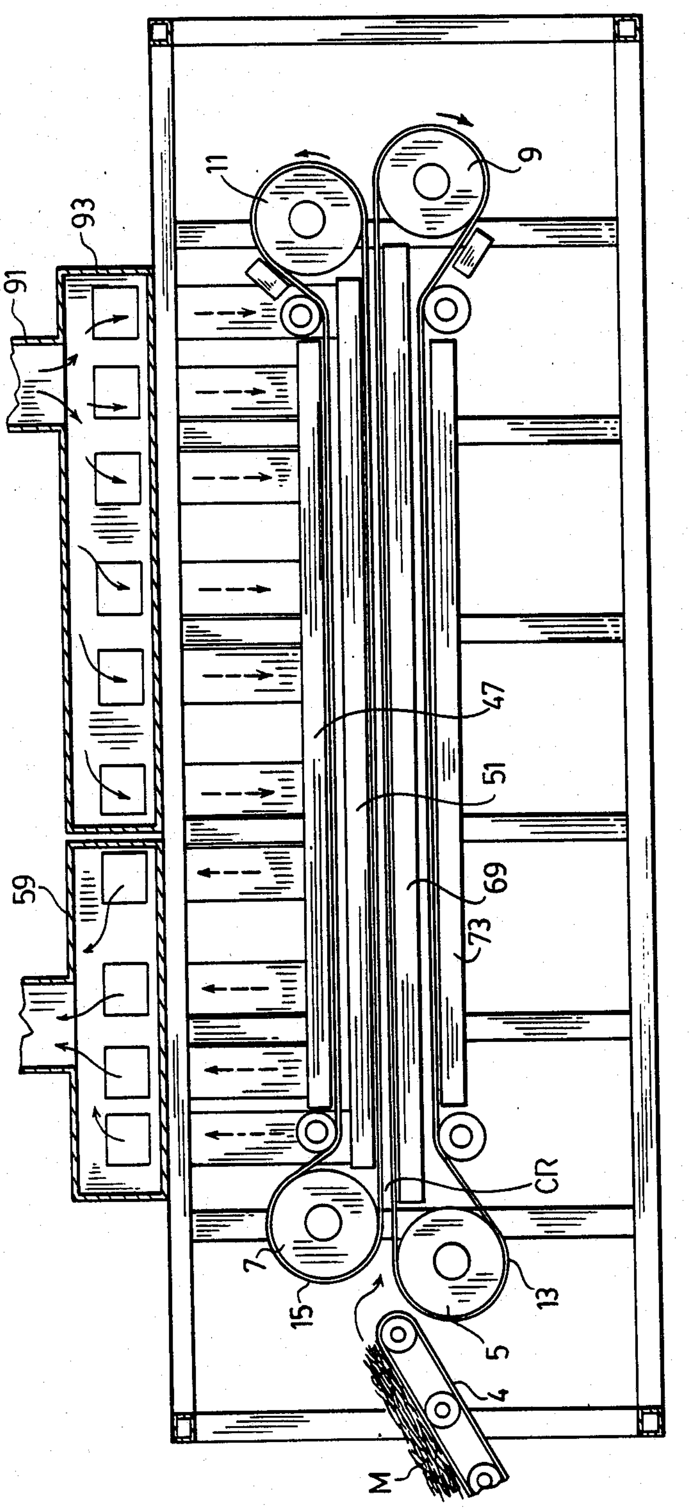
FIG. 3 is a longitudinal section view, showing the heat duct regions through the curing device of FIGS. 1 and 2.
Figure 5:
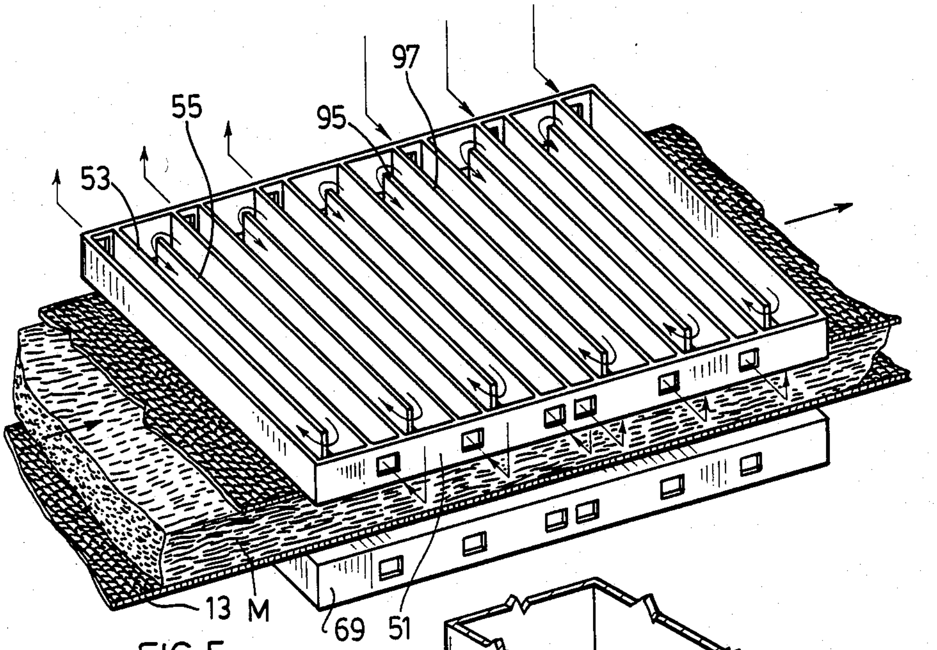
FIG. 5 is a perspective view of a manifold box in the curing region of the curing device of FIGS. 1 and 2.

The belts themselves, as well seen in FIGS. 2 and 3, are endless, and as seen in FIG. 5, have a mesh-like construction, which is of a metallic heat-conductive material. These two belts engage the material as it is being fed into the device and drive the material through and out of the curing region, to a suitable handling station (again, not shown and not forming part of the present invention) which receives and carries the material away from the curing device. The material itself, even at introduction to the curing device, has adequate cohesiveness, or bonding to itself, to enable it to be pulled through the curing region by the endless mesh feed belts.

Returning to FIGS. 1 and 2, it will be seen that the lower and upper body sections of the curing device are supported independently of one another. More particularly, the lower body section is supported by moveable mechanical jacks 3, while the upper body section is supported in a stationary position by means of upright supports 2, extending from a common base support, as shown in FIG. 1. The purpose of providing the lower body section on moveable jacks is to enable adjustment of the gap within the curing region, according to the thickness of material to be introduced, thereby adapting the curing device for use in either complete or partial curing of many different types of materials.

Mounted atop the curing device and supported by the upper body section is high capacity incinerator 27. This particular unit, which includes an interior burner 29, operates at 4,000,000 B.T.U.'s, which although very significant, is relatively small in comparison with many industrial curing devices operating on a much less efficient basis than the curing device of the present invention. In fact, the curing device as shown, and for reasons to be described later in detail, occupies only about one quarter the floor space of that required for a standard curing device, operating on a much less efficient basis and not capable of providing the same results as the curing device of the present invention.

The efficiency of the curing device as shown, is achieved through a series of ducts, which carry heated gases from the incinerator, mixed with relatively cool temperature controlling gases, through the curing region, and by heat transfer to the heat conductive metallic mesh belts, provide curing of the material. The incinerator, which is the source of the heated gases, operates at a temperature of about 1600 degrees fahrenheit. This extremely high operating temperature provides such a high degree of burning that the incinerator is able to exhaust directly to atmosphere, through a first exhaust outlet 31, free of pollution because essentially all contaminants are completely burned at this high operating temperature. Furthermore, provided at the forward feed of the curing region are a pair of suction members 17 and 19, connected to the inlet 23 of a fan 21, having an outlet 25 to incinerator 27. These suction members are provided as a further safety feature, in that as the two belts grip the mangle material, or whatever other material entering the curing region, there may be a slight expelling of either the material or the resin in the material, as it is compressed in the feed to the curing region, thereby resulting in airborn pollutants. However, these airborn pollutants are immediately drawn in by the suction members 17 and 19, and carried directly to the incinerator where again, they are burned at extremely high temperatures, and exhausted free of any pollutants, directly to the atmosphere.

Incinerator 27 also includes a second exhaust 33, to a mixing chamber, generally indicated at 35. This mixing chamber is also open to a cooled gas return for drawing in relatively cool gas to be mixed with the extremely high heat incinerator gases, entering the mixing chamber through incinerator exhaust 33. This mixing of the cooled gas with the heated exhaust, which then is conducted through the curing region, is important in that, as mentioned above, the incinerator is operated at extremely high temperatures, for purposes of burning all potential pollutants, thereby providing a non-polluting exhaust to atmosphere; however, this same exhaust is at a temperature too high, to effect graduated and partial curing of material, as required of the device. Therefore, it is important that the exhaust gas from the incinerator to the curing region be lowered to an appropriate temperature, to provide desired curing results. Typically, the exhaust to the curing region should be at a temperature level, such that the metallic mesh belts are maintained anywhere from about 270 to about 400 degrees fahrenheit, and optimally at about 320 degrees fahrenheit. The effective reduction in the incinerator exhaust temperature is achieved by means of mixing chamber 35, which, as mentioned above, receives heated gases directly from the incinerator. These gases are then fed through a series of ducts to the curing region where they give off much of their heat energy and are returned by a further series of ducts, and as to be described later in detail, back to the mixing chamber. These relatively cooled gases returned to the mixing chamber, effectively reduce the temperature of the incinerator gases such that the metallic belts are maintained in a heat exchange process, at the required temperature level.

Mixing chamber 35 includes a first mixing region 37, and a second mixing region 87 controlling first and second heating zones. If necessary, further additional mixing regions can be added to the mixing chamber to provide further zone heating effect, which may be controlled for the curing of different materials at different temperatures.

Figure 7:
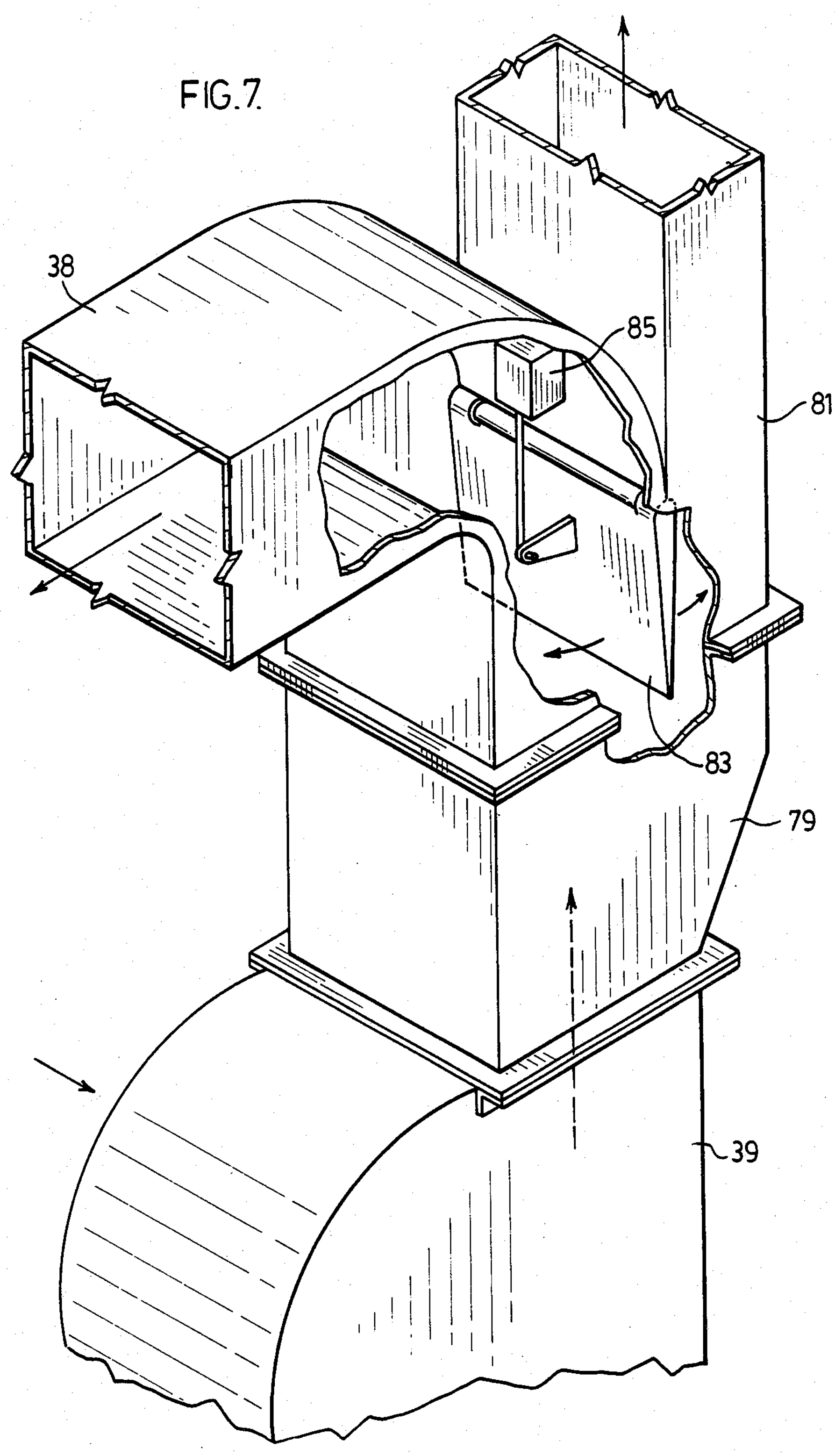
FIG. 7 is an enlarged partially cut away perspective view of an exhaust damper mechanism used as a temperature control in the curing device of FIGS. 1 and 2 and FIG. 8 is an enlarged sectional view of the exit end of the curing region of the curing device of FIGS. 1 and 2.

In the arrangement shown, the first zone is operated by means of fan 39, which draws controlled temperature gases from mixing region 37, These controlled temperature gases are, as described above, a mixture of heated gases directly from the incinerator, as well as cooled gases returned from the curing region. In the event that the cooled gases do not have the adequate temperature reduction effect on the incinerator gases, fan 39 is provided, as shown in FIG. 7, with a further temperature control arrangement in the form of a head 79, fitted directly atop the fan. This head includes a duct extension 38, extending to the curing region, as well as an exhaust 81, directly to atmosphere. Provided interiorly of head portion 79 is a damper 83, controlled through a thermostatically-operated switch 85. This switch determines the position of the damper, which, in turn, determines the amount of exhaust to atmosphere, versus the amount of heated gas flowing through duct extension 38 to the curing region. If the mixed gases are not adequately cooled to go to the curing region, as determined by switch 85, then damper 83 closes off duct extension 38, resulting in exhaust directly to atmosphere. As the mixed gas temperature then begins to drop because of the return of further cooled gases, damper 83 is moved by switch 85, to allow gases to flow out of duct extension 38 to the curing region, and either partially, or totally closing off exhaust 81. Accordingly, the thermostatically-controlled damper additionally provides a temperature control over the temperature of the gases to the curing region.

Figure 4:
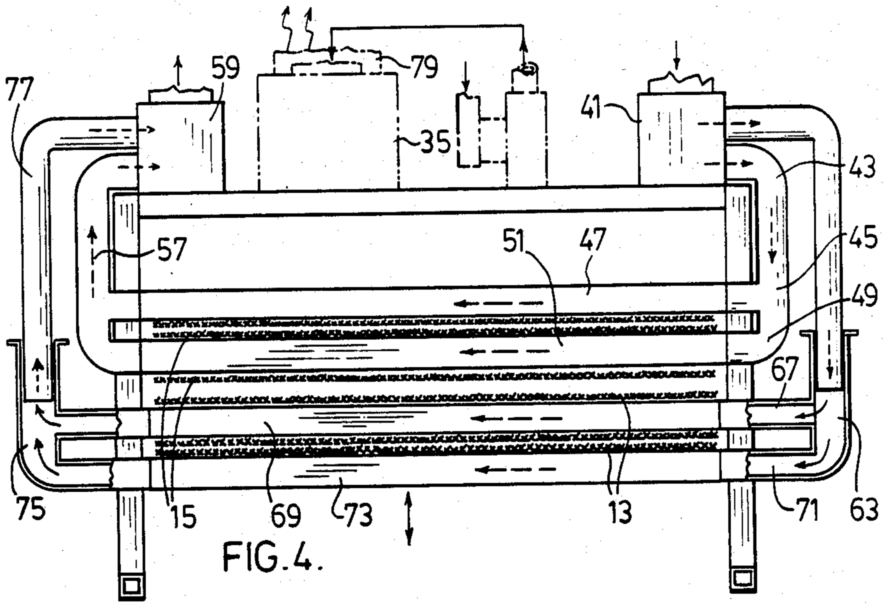
FIG. 4 is a cross sectional view, of the heat duct regions of the curing device of FIGS. 1 and 2.

The temperature controlled gases flow from duct extension 38 to a manifold assembly 41, as shown in FIGS. 1 and 4. This manifold assembly distributes the heated gases to a first duct member 43, and a second duct member 61. Duct member 43, in turn, branches off to duct portions 45 and 49, to heater box assemblies 47 and 51. These heater box assemblies, as best seen in FIG. 4, are positioned closely adjacent upper metallic mesh belt 15. More particularly, box assembly 47 is positioned above belt 15 on its return pass, while box assembly 51 is sandwiched by the belt 15, heat it both on its return pass and on its forward engagement pass, as the belt is cooperating to drive the material through the curing region.

Heater box assembly 51 is shown in detail in FIG. 5, and includes a plurality of interior baffles. The forward end of the heater box assembly located to the left-hand side of the figure, is provided with baffles 53 and 55, causing the heated gases entering from duct portion 49, to be evenly distributed over the interior of the forward end of the heater box assembly. This even heat distribution is in turn, transferred through heat exchange to metallic mesh belt 15, which then heats up to assist in the curing of the material in the curing region. It is to be appreciated that this interior baffle construction is repeated at each of the heater box assemblies, including box assembly 47, above the return pass of upper belt 15, as well as box assemblies 69 and 73, referred to below.

Each of the heater box assemblies, including boxes 47 and 51, is set up such that there is an effective heat transfer from the gases flowing through the baffle arrangement, to the respective metallic mesh belts. The gases after giving up the heat energy, within heater boxes 47 and 51, exit the heater box assemblies on the opposite side of the curing device through a further duct member 57, where there is a reuniting of the branch duct portions, carrying the now relatively cool gases upwardly to a further manifold 59.

Figure 6:
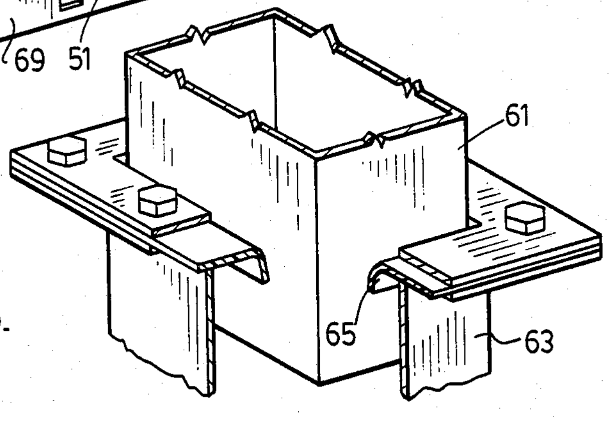
FIG. 6 is an enlarged cut away perspective view of a telescopic heat duct of the curing device of FIGS. 1 and 2.

As mentioned above, duct member 61, also carries heated gases from manifold 41 to the curing region. This particular duct member cooperates with a further duct member 63, with which duct member 61 is telescopically engaged. The actual fitting of the two duct members with one another is well shown in FIG. 6, where duct member 63 is provided with an internal insulation 65, which, while allowing the two duct members to telescope relative to one another, prevents the escape of any heated gases between the two duct members.

As is seen in FIG. 1, duct member 63 extends down to a pair of branch ducts 67 and 71, to heater box assemblies 69 and 73, respectively. Accordingly, the telescopic duct arrangement enables relative height adjustment of the lower body portion of the curing device, relative to the upper body portion, for, as mentioned above, varying the gap in the curing region, according to the material to be cured. By using the telescopic duct the lower body section can either be raised or lowered through the jacks 37, while still maintaining a constant duct connection from the manifold on the upper body section to heater box assemblies 69 and 73.

Heater box assemblies 69 and 73 receiving gases from the telescopic duct are positioned for heat transfer with the lower metallic mesh belt 13. More particularly, box assembly 69, as seen in FIG. 5, is immediately below belt 13 on its forward drive movement through the curing device, while box assembly 73, is, as well shown in FIG. 4, immediately below belt 13 during its return pass back to the forward material engage pass.

As will be clearly apparent from the description above, this arrangement provides not only a very even heat distribution through heat transfer across each of the mesh belts, but in addition, provides heating during the active engage movement of the belts, as well as a preheat, while each of the belts is on its return pass back to the material engage position.

Again, returning to FIG. 2, second mixing region 87, downstream of mixing region 37, also receives heated gases directly from incinerator 27. A fan 89, (also fitted with a damper control, not shown) draws these heated gases from mixing region 87, and blows the resultant incinerator and return gas mixture, at a controlled temperature, in the same manner as described above, through duct 91 to manifold 93. Extending downwardly from manifold 93 are a plurality of branch ducts, to the downstream, or rearward ends, of the heater box assemblies, referred to above. Provided at the rearward end of the heater box assemblies are a plurality of baffles extending in the opposite direction to the baffles at the forward ends of the heater boxes. For example, heater box assembly 51 includes baffles 95 and 97, extending in the second heating zone, in opposite directions to baffles 53 and 55, at the forward end of heater box assembly 51, in the first heating zone.

The gases in the second heating zone flow around the baffles at the downstream side of the heater box assemblies and give off their heat energy through the heater box assemblies to the metallic mesh belts, from both above and below the belts, in the same manner as that described with respect to the first heating zone. The gases are relatively cooled by this heat exchange and then flow outwardly of the heater box assemblies to branch duct portions 99, 101, 103 and 105, and reunite to flow back to outlet manifold 107, as shown in FIG. 1.

From the drawings and the description immediately above, it will now be seen that the gases within the first and second heating zones, flow in opposite directions to one another, i.e., in the first heating zone the gases flow down the right side of the curing device through the heater box assemblies and back up along the left side of the device, whereas in the second or downstream heating zone, the gases flow down along the left side of the device, through the heater box assemblies, and back up along the right side of the curing device. This arrangement, again, adds to the efficient and even heat distribution of the gases, along the length of the curing device; however, it is to be appreciated that in some instances, only a single heating zone may be required, whereas in other instances, further additional heating zones to those shown in the drawings may also be required for the full curing of different types of materials. Such additional heating zones will also be preferably set up in alternating flow paths for maximum heat distribution purposes.

Returning to the operation of the second, or downstream heating zone, the relatively cool gases are, as mentioned above, collected in manifold 107. From here the gases are returned directly to second mixing region 87 of mixing chamber 35, where they are reheated by the gases entering directly from the incinerator, while at the same time, providing a cooling effect to the gas mixture for returning to the curing region througt duct 91, manifold 93, etc.

Figure 8:
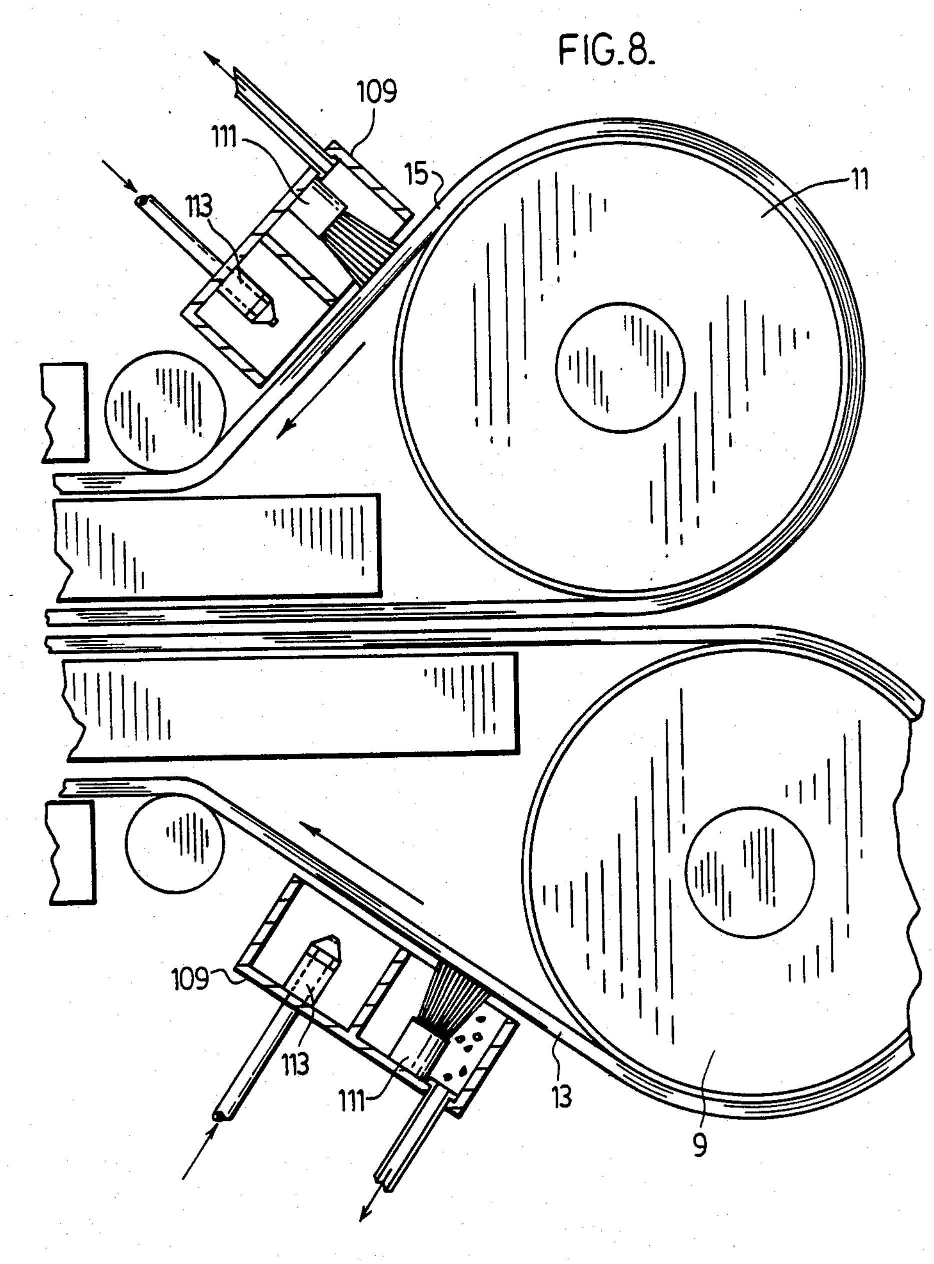

It will now be clearly understood that the heating of the mesh belts is critical to provide effective curing through heat transfer to the material within the curing device. Accordingly, it is important to keep the belts clean and free of any contaminants, which might otherwise detract from effective heating of the belts. FIG. 8 shows a particularly good arrangement to provide such cleaning in the form of sprayer and brush assemblies 109 at each of the upper and lower mesh belts. These cleaning assemblies are positioned on the return side of the respective belts immediately downstream of rollers 9 and 11 so that the individual belts are cleaned of any imbedded material which is picked up while the belts engage the material to be cured and which might otherwise effect the conductivity of the belts for heat pick-up purposes.

Each of the cleaning assemblies 109, specifically comprises a brush 111, in direct contact with the metallic mesh belt, for physically agitating any particles from the belt and a spray member 113, for spraying a cleaning solvent onto the belt surface. The belts are continuously cleaned at the positions shown in FIG. 8, after which the cleaned portion returns through the heater box assembly for preheating and movement back to the curing device.

From the description above, it will be clearly seen that the curing device of the present invention has extremely effective curing characteristics through the use of completely closed ducts by purposes of heat transfer and does not require the use of heated gases blowing directly on material to be cured, which otherwise results in both disturbance of the material, and substantial wastage of heat energy. The closed loop system of the curing device of the present invention is extremely energy efficient and is capable of providing material curing with substantial fuel and heat savings, compared to open construction curing device of substantially increased size and cost, relative to the curing device of the present invention.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A curing device for at least partially curing a material in said device which comprises a curing region to receive the material, heating means for generating heated gases which are recycled through closed ducting means extending through said curing region from said heating means and fan means for blowing the heated gases through said ducting means, and carrier means for carrying the material through said curing region, said carrier means being heat conductive and in heat exchange with said ducting means whereby heat from the heated gases is transferred from said ducting means through said carrier means to the material to effect such curing without the gases blowing directly on and disturbing the material, said heating means having a first exhaust at a sufficiently high temperature to be substantially pollution free directly to atmosphere and a second exhaust to a mixing chamber for mixing with the relatively cooled recycled gases and controlling temperature of the heated gases in said ducting means according to degree of curing required.

2. A curing device, as claimed in claim 1, wherein said ducting means comprises a series of closed ducts along and providing extended heating of said carrier means throughout said curing region.

3. A curing device, as claimed in claim 2, wherein said carrier means extends in a generally horizontal direction and wherein said ducts are positioned both above and below and at generally right angles to said carrier means for top and bottom heating thereof.

4. A curing device, as claimed in claim 3, wherein said carrier means comprises upper and lower endless belts moving in a drive direction for cooperatively engaging and driving the material through said curing region and then reversing and moving in a return direction back to the drive direction, said series of ducts extending both above and below said endless belts in heat exchange therewith and being heated by said series of ducts when moving in both said drive direction for curing of the material and said return direction as a preheat prior to such curing.

5. A curing device, as claimed in claim 4, wherein said upper and lower belts comprise metallic mesh belts wrapped around a plurality of rollers for receiving said belts, and provided with friction material for driving same.

6. A curing device, as claimed in claim 4 wherein said device comprises upper and lower body sections separated from one another by said curing region with said upper and lower belts forming part of said upper and lower body sections respectively, at least one of said body sections being adjustable in height to adjust separation between said upper and lower belts and gap of said curing region according to the type of material introduced therebetween.

7. A curing device, as claimed in claim 5 wherein said lower body section is adjustable in height and supported by height adjustable legs, said heat generating means being supported atop said upper body section which is supported independently of said lower body section.

8. A curing device, as claimed in claim 7, wherein said ducting means extending to said lower body section is adjustable in length to accommodate height adjustment of said lower body section.

9. A curing device, as claimed in claim 8, wherein said ducting means extending to said lower body section includes vertical telescopic sections with an insulating material therebetween to prevent heat escape past said telescopic sections.

10. A curing device, as claimed in claim 1, wherein said heating means comprises an incinerator positioned atop said device.

11. A curing device, as claimed in claim 10, wherein said ducting means continues from said mixing chamber to said curing region in close proximity to said carrier means and without interruption extends back to said mixing chamber.

12. A curing device, as claimed in claim 11, wherein said fan means includes venting means for venting excessively hot gases to atmosphere for controlled curing temperatures.

13. A curing device, as claimed in claim 12, wherein said venting means comprises a thermostatically controlled damper for automatically opening to vent heated gases at a preset temperature to assist in the controlling of the temperature of the heated gases in said ducting means.

14. A curing device, as claimed in claim 11, having first and second side faces beneath said incinerator and wherein said ducting means extends along said first and second side faces.

15. A curing device, as claimed in claim 14, wherein said mixing chamber includes a first mixing region with a first duct portion extending therefrom to a series of first branch ducts down said first side face to said curing region immediately above and below said curing region, said first branch ducts then returning up said second side face and reuniting as a second duct portion extending back to said first mixing region.

16. A curing device, as claimed in claim 15, wherein said mixing chamber includes a second mixing region with a third duct portion extending therefrom to a series of second branch ducts down said second face on the opposite side of said device to said series of first branch of ducts, said series of second branch ducts being located downstream of said series of first branch ducts again immediately above and below said curing region, and then returning up said first side face of said device and reuniting as a fourth duct portion extending back to said second mixing region.

17. A curing device, as claimed in claim 15, wherein said series of first and second branch ducts extend in heater box assemblies horizontally across said curing region at generally right angles to said carrier means, said heater box assemblies including interior baffle means to provide multi-pass heated gas flow through each of said heater box assemblies.

18. A curing device, as claimed in claim 10, including suction means for drawing in any air-borne pollutants from the material entering said curing device, and for directing any such pollutants to said incinerator for incineration and exhaust thereof to atmosphere at pollution-free temperatures.

19. A curing device, as claimed in claim 5, including spray and brush means secured adjacent said metallic mesh belts to provide cleaning thereof while said belts are in motion.

* * * * *